United States Patent [19]

Floyd et al.

[11] Patent Number: 5,147,908
[45] Date of Patent: Sep. 15, 1992

[54] CATIONIC POLYVINYL ALCOHOL BINDER ADDITIVE

[75] Inventors: William C. Floyd, Chester; Louis R. Dragner, Rock Hill, both of S.C.

[73] Assignee: Sequa Chemicals Inc., Chester, S.C.

[21] Appl. No.: 587,012

[22] Filed: Sep. 24, 1990

[51] Int. Cl.$^5$ ................................. C08L 3/04
[52] U.S. Cl. ..................... 524/49; 524/55; 524/503; 525/57; 525/58
[58] Field of Search ............... 524/503, 49, 55, 57, 524/58

[56] References Cited

U.S. PATENT DOCUMENTS

| | | | |
|---|---|---|---|
| 3,573,236 | 3/1971 | Barlow | 260/17 |
| 3,597,313 | 8/1971 | Williams et al. | 162/167 |
| 3,600,342 | 8/1971 | Nickerson et al. | 260/17 |
| 3,700,611 | 10/1972 | Nickerson et al. | 260/17 R |
| 3,810,783 | 5/1974 | Bomball | 117/122 S |
| 3,912,529 | 10/1975 | Kotani et al. | 106/187 |
| 3,932,335 | 1/1976 | Gorton | 260/29.6 |
| 4,169,088 | 9/1979 | Hansen | 260/29.6 |
| 4,311,804 | 1/1982 | Raghava et al. | 524/503 |
| 4,405,375 | 9/1983 | Gibson et al. | 106/277 |
| 4,461,858 | 7/1984 | Adelmann | 524/503 |
| 4,528,316 | 7/1985 | Soerens | 524/503 |
| 4,537,807 | 8/1985 | Chan et al. | 428/74 |
| 4,816,540 | 3/1989 | Onishi | 527/300 |
| 4,837,087 | 6/1989 | Floyd et al. | 428/511 |
| 4,888,386 | 12/1989 | Huang et al. | 524/503 X |
| 4,954,577 | 9/1990 | Dünwald et al. | 524/503 X |

OTHER PUBLICATIONS

Zunker, David W.; "Incorporating The Benefits Of Polyvinyl Alcohol At the Wet-End Of Papermaking"; 1982 Papermakers Conference.

Primary Examiner—Joseph L. Schofer
Assistant Examiner—J. M. Reddick
Attorney, Agent, or Firm—Mitchell D. Bittman

[57] ABSTRACT

A cationic polyvinyl alcohol binder additive is prepared suitable for addition in the wet-end of a paper making process by reacting a blocked glyoxal resin, a cationic water-soluble aldehyde reactive polymer and a polyvinyl alcohol polymer.

24 Claims, No Drawings

CATIONIC POLYVINYL ALCOHOL BINDER ADDITIVE

BACKGROUND OF THE INVENTION

This invention relates to preparing a cationic polyvinyl alcohol additive suitable for addition in the wet-end of a paper making process and more specifically to a non-formaldehyde additive which is a stable fluid aqueous solution at high solids yet imparts improved performance to the resultant paper.

There are numerous commercial wet end additives being used in paper making. Among the additives are cationic starches and melamine-formaldehyde resins.

Cationic starches are used for improving retention of cellulosic fines, filler and pigment, and also for increasing the dry strength of the resulting paper. However, the use of cationic starch can lead to irregularities in performance (irreproducibility of batches, low solution stability, low wet strength), incompatibility with other components in the furnish (alum, size, other salts), and high biological oxygen demand (BOD) for additive not on the pulp or recycled, and which is lost in the waste water.

Other wet-end additives are often used to confer permanent wet strength to the resulting paper, such as cationic urea-formaldehyde UF resins, amine-containing polyamides treated with epoxides (e.g. Hercules' "Kymene" 557) or melamine-formaldehyde (MF) resins (e.g., "Parez" 607 of American Cyanamid). However, UF resins are slow curing on the machine, while the polyamides are relatively expensive, slow to absorb on the cellulose pulp, and make repulping of the paper relatively difficult. The MF resins show poor pigment and filler retention, and also exhibit low water absorbency, whereas absorbency is often desired along with wet strength. All of these types of additives give only modest enhancement of dry strength. Also, none of the above types are now recognized as improvers of wet web strength (at their usual concentration of application) which would permit greater production control and in some cases, increased productivity.

Polyvinyl alcohol has been used for surface sizing and surface coating because of its excellent film forming and binder characteristics. However, polyvinyl alcohol is not added directly to the wet-end of the paper making process because most of the polyvinyl alcohol would pass through the wet paper web end into the white water. The absorption and retention of unmodified alcohol on fiber and filler is insufficient to resist the voluminous water discharge and the hydrodynamic forces present during paper formation.

Methods have been disclosed for associating polyvinyl alcohol with a positive charge to allow it to be incorporated into the wet-end of paper making by reacting the polyvinyl alcohol with trimethylolmelamine acid colloid (see Tappi Journal, Volume 66, No. 11, 11/1983). Also U.S. Pat. No. 4,461,858 discloses a polyvinylalcohol/melamine-formaldehyde resin interaction product. However a serious drawback in the use of such materials is that they contain free formaldehyde. The presence of free formaldehyde is undesirable, not only because of its unpleasant odor, but because it is an allergen and an irritant, which can cause severe reactions in the operators who manufacture the agent and who treat and handle products containing it. A further drawback for the cationic polyvinyl alcohol/melamine-formaldehyde resin products as disclosed in U.S. Pat. No. 4,461,858 is that the solutions are stable only at very dilute concentrations (e.g., 3%) and gel at higher solids (e.g., gel in minutes at 12% solids). Another drawback of U.S. Pat. No. 4,461,858 is that in forming the MF resin acid colloid at a pH near 1 to 2 concentrated hydrochloric acid is used, which is a very corrosive solution which requires exotic materials for proper handling.

A further problem of the prior art is that the amount of cationic charge imparted to the polyvinyl alcohol is difficult to control as the melamine-formaldehyde resin acid colloid is a variable composition. In addition, the use of melamine-formaldehyde resins or polyamino polyamide epichlorohydrin adduct as a wet-end additive makes the resultant paper difficult to repulp and recycle because the resin does not readily break down during repulping.

SUMMARY OF THE INVENTION

Briefly, the present invention prepares a stable aqueous non-formaldehyde based cationic polyvinyl alcohol binder additive by reacting an aqueous solution of blocked glyoxal resin with a cationic water-soluble, aldehyde-reactive polymer and a polyvinyl alcohol polymer. Stable fluid solutions of the additive can be obtained at up to 12% or higher solids levels.

DETAILED DESCRIPTION OF THE INVENTION

The present invention prepares an additive which is highly adsorbent on cellulose pulp and as such is suitable for incorporation in the wet-end of the paper making process. Significantly improved properties in the paper were exhibited including internal bond strength, dry tensile strength, reduced elongation and sizing effectiveness. In addition, because this additive can utilize precisely defined polymers of known cationic charges, the amount of cationic charge imparted to the polyvinyl alcohol can be precisely controlled, thus enabling improved control over the drainage and retention properties of the paper and avoiding the problems due to excessive cationic charge, such as flocculation of the fibers. Further, since the glyoxal resin component utilized in the additive is destroyed at higher pH's (e.g. above pH 10), the resultant paper can be more readily repulped and recycled by utilizing higher pH's during repulping.

The additive of the present invention is a reaction form of a blocked glyoxal resin, a cationic water-soluble, aldehyde-reactive polymer and a polyvinyl alcohol polymer. This additive is stable in solution at solids levels even as high as 12% by weight solids or higher.

The glyoxal resin component of this mixture is blocked to inhibit it from reacting fully with the other components prior to drying. Inhibiting the reactivity of the glyoxal resin allows a product to be formulated at higher solids and/or lower viscosity than otherwise possible with unblocked glyoxal resin. The blocked glyoxal resin reacts with both the polyvinyl alcohol and the cationic water-soluble, aldehyde-reactive polymer, loosely attaching them together thus imparting a cationic charge to the polyvinyl alcohol. The blocked glyoxal resin appears to crosslink by a two-step process with the first step occurring in the reaction in aqueous solution with the cationic polymer and polyvinyl alcohol, with the second crosslinking reaction being delayed until the paper is dried. Using this invention, it is possible to prepare a paper additive with a high level of solids. With free (unblocked) glyoxal, the additive can be unstable resulting in thickening or gelling of the additive, or the additive may show unacceptably high viscosity or gelling over time.

Glyoxal readily reacts with binders such as polyvinyl alcohol and with the cationic water-soluble, aldehyde-reactive polymer and other polymeric agents in a crosslinking reaction. Crosslinking causes the mixture of glyoxal resin and the polyvinyl alcohol and/or polymeric agents to thicken or gel. By suitably blocking the glyoxal resin, the reactivity can be controlled so that final crosslinking occurs in the paper as it is being dried and cured. Furthermore, judicious choice of levels of the various components allows the papers properties to be enhanced upon drying the paper with the glyoxal resin reacting with the polyvinyl alcohol, the cationic polymer and the cellulose pulp. Generally, the amount of blocked glyoxal resin is within the ratio of 1:4 to 25:1 by dry weight of the blocked glyoxal resin to cationic polymer, preferably about 1:1 when the cationic polymer is an acrylamide and about 1:2 when the cationic polymer is a starch. Both the glyoxal resin and the cationic polymer generally comprise 10-60%, preferably 25-40% by dry weight of the additive. Mixing polyvinyl alcohol or a cationic polymer with free (unblocked) glyoxal, or adding free glyoxal to an additive containing such polymeric agents generally causes thickening or gelling due to premature reaction.

The glyoxal may be blocked by reaction with a blocking component becoming a blocked glyoxal resin. Suitable blocking components include urea, substituted ureas (such as dimethyl urea), various cyclic ureas such as ethylene urea, substituted ethylene ureas (such as 4,5-dihydroxyethylene urea), propylene urea, substituted propylene ureas (such as 4-hydroxy-5-methyl-propylene urea, or 4-hydroxy-5,5-dimethyl propylene urea), glycols (such as ethylene glycol to make 2,3-dihydroxydioxane, or dipropylene glycol to make an oligomeric condensation product), polyols (i.e. containing at least three hydroxy groups such as sorbitol or such as glycerin to make 2,3-dihydroxyl-5-hydroxymethyl dioxane) as well as unalkylated or partially alkylated polymeric glyoxal derived glycols, such as poly(N-1',2'-dihydroxyethyl-ethylene urea). Preferably, the blocking component is a urea or cyclic urea because the blocked glyoxal resins formed are very stable providing a long shelf life.

The reaction of the glyoxal and the blocking component, preferably a urea or cyclic urea, generally takes place within the temperature range of about 25° to 100° C., and preferably about 40° to 80° C. In general the pH of the reactants and resultant binder additive is about 2.5 to 8.0 and preferably is about 4 to 7.5.

The urea reactant may be urea, monourein or the like. If a cyclic urea is selected it may have one of the following general formulas:

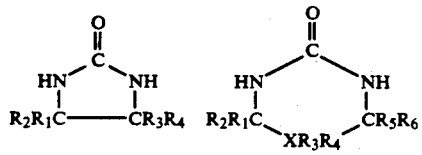

wherein $R_1$, $R_2$, $R_3$, $R_4$, $R_5$ and $R_6$ may be the same or different and each may be H, OH, COOH, R, OR, or COOR wherein R is an alkyl or a substituted alkyl group having 1 to 4 carbon atoms and X may be C, O, or N; when X is O, $R_3$ and $R_4$ are each zero; when X is N, $R_3$ or $R_4$ is zero.

Typical examples of such urea reactant compounds include, but are not limited to ethylene urea, propylene urea, uron, tetrohydro-5(2 hydroxyethyl)-1,3,5-triazin-2-one, 4,5-dihydroxy-2-imidazolidinone, 4,5-dimethoxy-2-imidazolidinone, 4-methyl ethylene urea, 4-ethyl ethylene urea, 4-hydroxyethyl ethylene urea, 4,5-dimethyl ethylene urea, 4-hydroxy-5-methyl propylene urea, 4-methoxy-5-methyl propylene urea, 4-hydroxy-5,5 dimethyl propylene urea, 4-methoxy-5,5-dimethyl propylene urea, tetrahydro-5-(ethyl)-1,3,5-triazin-2-one, tetrahydro-5-(propyl)-1,3,5-triazin-2-one, tetrahydro-5-(butyl)-1,3,5-triazin-2-one, 4-hydroxy-5,5-dimethylpyrimid-2-one, and the like, and mixtures thereof Generally, the level of glyoxal to urea is within the range of about 0:8 to 2.2:1. Included within the blocked glyoxal resins are those prepared as described in U.S. Pat. Nos. 4284758, 4345063, 4455416, 4547580 and 4625029.

The polyvinyl alcohol polymer component of the product of the present invention can be a "completely" hydrolyzed grade (mole percent hydrolysis of acetate groups 99.0 to about 100%), a partially hydrolyzed grade (percent hydrolysis 80-90%), a polymer of intermediate level of hydrolysis, or blends thereof. The completely hydrolyzed grades and also the higher molecular weight commercial grades are preferred when papers are desired with the highest wet strength properties. The polyvinyl alcohol should have a degree of polymerization of from about 600 to 3000, as reflected in the inherent viscosity values πinh) of from about 0.3 to about 1.4 dl/g. The inherent viscosity is measured in water a 30° C., at a concentration of 0.5 g/dl. This approximately corresponds for many commercial grades of polyvinyl alcohol to a solution viscosity (4% aqueous at 20° C., Hoeppler falling ball method), of from about 4 to about 160 cps, with about 10-70 centiposies being preferred. Generally the polyvinyl alcohol is added at a level of 40 to 90%, preferably 60 to 75% by dry weight of the additive.

The polyvinyl alcohol component of the present invention can also be a copolymer of vinyl alcohol, such as one obtained by hydrolyzing a copolymer of vinyl acetate with small amounts (up to about 15 mole percent) of other monomers. Suitable comonomers are e.g. esters of acrylic acid, methacrylic acid, maleic or fumaric acids, itaconic acid, etc. Also, copolymerization of vinyl acetate with hydrocarbons, e.g. α-olefins such as ethylene, propylene or octadecene, etc., with higher vinyl esters such as vinyl butyrate, 2-ethyl hexoate, stearate, trimethyl acetate, or homologues thereof ("VV-10" type of vinyl esters sold by Shell Chem. Co.), etc. gives copolymers that can be hydrolyzed to suitable polyvinyl alcohol copolymers. Other suitable comonomers are N-substituted acrylamide, unsubstituted acrylamide, vinyl fluoride, allyl acetate, allyl alcohol, etc. Also the free unsaturated acids such as acrylic acid, methacrylic acid, monomethyl maleate, etc. can act as comonomers.

The cationic water-soluble, aldehyde reactive polymer is added to the additive to impart a cationic charge. A preferred cationic polymer is a cationic acrylamide copolymer because of the ability to accurately control the cationic charge. The acrylamide copolymer can be rendered cationic by means of a Mannich Reaction which reacts formaldehyde and dimethyl amine with the amide groups of the polymer, or by incorporation of a cationic monomer during the polymerization reaction. The cationic acrylamide copolymer is a copolymer of acrylamides such as acrylamide, methacrylamide, N,N-dimethyl acrylamide and N-methylol acrylamide, with cationic ethylenically unsaturated monomers such as quaternary salts of dimethyl amino propyl methacrylate, dimethyl aminopropyl methacrylamide, methyl chloride quaternary salt of dimethyl amino ethylmethacrylate and methyl sulfate quaternary salt of dimethyl amino propyl methacrylamide. The cationic acrylamide copolymer can also be copolymerized with additional monomers, preferably water-soluble monomers such as hydroxy ethyl acrylate, vinyl pyrolidone and acrylic acid, but can also be copolymerized with limited amounts (typically less than 15%) of water insoluble monomer such as vinyl acetate, methyl acrylate and ethyl acrylate provided the resultant copolymer is water-soluble. Other cationic water-soluble, aldehyde reactive polymers suitable for use in this invention include cationic guar gum and various cationic starches, especially those that have been additionally modified by acid hydrolysis or enzyme conversion. Cationic starch propionamide derivatives such as those described in U.S. Pat. No, 3,740,391 are also suitable. Depending on the wet end chemistry of the paper machine, it may be desirable to precisely control the amount of cationic polymer introduced in preparing the paper, since too much charge could upset the charge balance and cause flocculation of the fibers and lead to poor sheet formation, while too little charge could result in an inadequate amount of polymer being retained to impart desirable properties. Through the additive of this invention improved control over the amount of cationic charge is obtained.

To prepare the additive of this invention the blocked glyoxal resin, cationic polymer and polyvinyl alcohol polymer are mixed in aqueous solution then heated to both dissolve the polyvinyl alcohol and react the components. Generally the components are heated to 85° to 95° C. for 10-30 minutes. Generally, stable flowable solutions can be maintained at solids levels up to 12% and higher, preferably 5 to 12% by weight. By flowable is meant having a viscosity of below 3000 cps as measured with Brookfield Viscometer with a #3 spindle at 20 rpm at room temperature.

In an alternative embodiment, when a dry free flowing granular additive is desired, then such dry additive can be prepared by drying each of the components (e.g. oven drying, freeze drying or spray drying), granulating and mixing the components together. This dry mixture would then be mixed in aqueous solution and reacted as above when desired.

The additive thus prepared can be employed using the conventional methods of preparing paper sheets and other cellulosic products. Preferably, interaction with cellulose pulp material is carried out by internal addition to the cellulose pulp prior to formation of the paper sheet. Thus the aqueous solution of the interaction product may be added to the aqueous suspension of the paper stock while the latter is in the head box of the Fourdrinier, at the fan pump, in the stock chest, the hydropulper or any other point in the process prior to the point of sheet formation. The high adsorption rate of the additive with the pulp permits many options in this regard. Among the variety of pulps which may be effectively treated are bleached and unbleached sulfate (raft), bleached and unbleached sulfite, soda, neutral sulfite, semi-chemical, groundwood or blends of these fibers. In addition, fibers or viscose rayon, glass, regenerated cellulose, polyamide, polyester of polyvinyl alcohol can also be used in conjunction with the cellulose pulp. The preferred pH range of the pulp stock containing the additive inter-reaction product is from about 4 to about 8; with good adsorption and filler retention demonstrated over this range. The best wet strength properties of the resulting paper occur in the pH range of from about 5 to 7.5.

Materials which could be added to the pulp slurry along with additive include cationic surfactants, starch, polymers derived from polyamides containing amino groups along the polymer backbone, and reacted with epichlorohydrin (such as "Kymene" 557 from Hercules). Anionic polyacrylamide polymers, fortified rosin size, fillers, pigments, alum, etc., also can be present.

The sheet is then formed, pressed and dried by conventional means. The latter step serves to cure the additive and complete the crosslinking of the blocked glyoxal resin.

The amount of additive added to the pulp slurry ranges from about 0.02 to about 10%, based on the dry weight of the pulp. The preferred range is from about 0.05% to about 3%, and will depend on the characteristics desired in the finished paper product, the type of pulp, and the specific operating conditions.

The following examples serve to illustrate the present invention. All parts and percentages and proportions are by weight unless otherwise indicated.

EXAMPLE I

A series of samples was prepared at 12% total solids containing either 12% polyvinyl alcohol (PVOH) or 8% PVOH and 4% cationic polymer and resin. The PVOH used was Elvanol(®)71-30, a completely hydrolyzed medium molecular weight grade of polymer available from DuPont. The cationic acrylamide polymer was a 10 mole% cationic copolymer of acrylamide with methyl chloride quaternary salt of dimethylaminoethyl methacrylate (Sequex(®)PC, from Sequa Chemicals Inc.) which exhibited a viscosity of 1340 cps (ambient temperature, Brookfield, #3 spindle, 50 rpm) at 18% solids. The resin was the blocked glyoxal resin, Sequex(®)R, a 1:2 cyclic urea:glyoxal condensation product at 46% solids from Sequa Chemicals, Inc.

A typical procedure is described as follows:

Deionized water was charged to a 1 liter, 4-necked flask equipped with a mechanical stirrer, thermometer and condenser. Cationic polymer and resin (if used) were then added and stirred. With continued stirring, the PVOH was slowly added through a powder funnel to form a well-dispersed slurry. This was heated to 85°-95° C. for 15 minutes, then cooled. Unless gellation occurred, this resulted in complete dissolving of the PVOH. Viscosity was measured with a Brookfield Viscometer, #3 spindle, 50 rpm at ambient temperature. The following formulations (in grams) were prepared in this manner with these results obtained:

| Item | A | B | C | D | E |
| --- | --- | --- | --- | --- | --- |
| Water | 440 | 398.9 | 382.2 | 365.6 | 415.6 |
| Cyclic Urea/glyoxal resin | — | 33.3 | 22.2 | 11.1 | 44.4 |
| Acrylamide copolymer | — | 27.8 | 55.5 | 83.3 | — |
| Polyvinyl alcohol | 60 | 40 | 40 | 40 | 40 |
| Resin/copolymer ratio | — | 2:1 | 1:1 | 1:2 | 1:0 |
| Viscosity, cps | 2325 | 1440 | 1930 | 2650 | 788 |

-continued

| Item | A | B | C | D | E |
|---|---|---|---|---|---|
| Total Solids | 12% | 12% | 12% | 12% | 12% |

EXAMPLE II

For purposes of comparison, samples were prepared and measured as in Example I with the blocked glyoxal resin (Sequex(®)) replaced by an experimental blocked glyoxal resin (a 2:1 glyoxal: sorbitol condensation product at 70% solids described in U.S. Pat. Nos. 4656296, 4547580 and 4537634), glyoxal and a methylated melamine-formaldehyde resin (Sunrez(®)106, 76% solids from Sequa Chemicals, Inc.). These samples were prepared by procedures identical to those in Example I at 12% total solids. The following formulations (in grams) were used with these results obtained.

| Item | A | B | C | D |
|---|---|---|---|---|
| Water | 431.4 | 391.4 | 410 | 433 |
| 40% Glyoxal | — | — | 50 | — |
| Melamine-formaldehyde resin | — | 13.1 | — | 26.3 |
| Sorbitol/glyoxal resin | 28.6 | — | — | — |
| Acrylamide Copolymer (SEQUEX PC) | — | 55.5 | — | — |
| Polyvinyl alcohol (ELVANOL 71-30) | 40 | 40 | 40 | 40 |
| Viscosity, cps | 590 | gelled at 88° C. | gelled upon cooling | gelled at 74° C. |

These results show that blocked glyoxal resins are unique in that they do not cause gellation as do conventional crosslinking agents such as glyoxal or melamine formaldehyde resins, whether used with or without a cationic acrylamide copolymer. Preparation of the additive with blocked glyoxal resin is also more convenient in that the materials are ready for immediate use and do not require extended aging periods.

EXAMPLE III

The samples prepared in Example I were drawn down to form films which were air dried. These films were measured for thickness, and tested for tensile strength and percent elongation with an Instron Model 1100 Tensile Tester. Results are shown below:

| Sample | Thickness (mils) | Tensile (Kg) | Tensile/Mil (Kg) | Elongation (%) |
|---|---|---|---|---|
| A | 4 | 6.94 | 1.74 | 279 |
| B | 4 | 8.89 | 2.22 | 7.13 |
| C | 4 | 9.23 | 2.31 | 10.4 |
| D | 3 | 7.79 | 2.59 | 9.57 |
| E | 4 | 9.68 | 2.42 | 7.97 |

These results show that reacting the PVOH in this manner greatly decreases the elongation of the polymer and provides a significant increase in tensile strength.

EXAMPIE IV

A pulp slurry was prepared from a 70/30 hardwood bleach kraft/softwood bleach kraft pulp at a 2.5% consistency and a Canadian Standard Freeness (CSF) of 500. The pH of the slurry was adjusted to 4.5 with sulfuric acid. Hand sheets were formed from 240 g of slurry to afford sheets of approximately 6 g in weight. Sheets were formed in a Nobel and Wood sheet mold, pressed between rollers and dried in a Noble Wood Model Dryer. Six sheets were formed from each experimental sample with results compiled from the three nearest in weight. The experimental products were added at a rate of 1.8 g (at 12% solids) to 1440 g of pulp slurry to attain a level of 0.6%. The resin used was Sequex R, a blocked glyoxal resin from Sequa Chemicals having a cyclic urea/glyoxal ratio of 1:2. The polymer used was a 10 mole % cationic polyacrylamide (a copolymer of acrylamide and methyl chloride quaternary salt of dimethyl aminoethyl methacrylate). The PVOH was Elvanol 71-30 from DuPont.

The experimentals were as follows:

Control-no additives

A—8% PVOH, 4% resin and polymer in a 2:1 dry ratio
B—8% PVOH, 4% resin and polymer in a 1:1 dry ratio
C—8% PVOH, 4% resin and polymer in a 1:2 dry ratio
D—12% PVOH, no resin, no polymer
E—8% PVOH, 4% resin, no polymer
F—8% PVOH, 4% sorbital:glyoxal (1:2) condensation product, no polymer The hand sheets were cut into 1 × 3 inch strips for tensile testing on an Instron Model 1100 tensile tester. Results are as follows:

| Sample | Dry Tensile Load, Kg | Dry Tensile Strain, % | Wet Tensile Load, Kg | Wet Tensile Strain, % |
|---|---|---|---|---|
| Control | 14.98 | 6.97 | 0.73 | 3.54 |
| A | 17.13 | 4.13 | 1.77 | 4.62 |
| B | 18.51 | 4.45 | 1.56 | 4.22 |
| C | 25.33 | 5.59 | 3.22 | 6.49 |
| D | 17.43 | 4.40 | 0.77 | 2.61 |
| E | 19.73 | 5.04 | 0.66 | 1.88 |
| F | 17.46 | 4.29 | 0.74 | 2.63 |

The results show that the three samples containing the cationic polymer exhibit comparable to superior dry tensile, and significantly superior wet tensile. There was little difference between the samples containing only PVOH and the samples containing PVOH and resin only. As a general trend, the greater the cationic content, the greater the tensile strength, indicating a greater quantity of strength-enhancing additives retained on the fibers. The unreactive cationic polyacrylamides alone at the levels present cannot account for the strength enhancements observed.

EXAMPLE V

A high-charge cationic potato starch (Sta-lok 400, A.E. Staley Co.) was slurried in water at 30% solids, and enzyme converted to a dextrose equivalent of 0.9. Final solids were 40% and viscosity was 90 cps (Brookfield #3, 100 rpm). A series of products was prepared using PVOH (Elvanol(®)71-30), a blocked glyoxal resin (Sequex(R)R) and the cationic enzyme converted potato starch. The products were formulated to all be 10% total solids and prepared by similar procedures.

The water charge was weighed into a one liter resin kettle followed by the cationic starch solution and resin. The PVOH was then added. The reaction was stirred and heated to 90° C. for 30 minutes, then cooled. No gellation occurred and samples maintained a stable viscosity for at least one month. Biocide was added to prevent spoilage. The following chart shows formulations (in grams) and viscosities measured on a Brookfield viscometer, #3 spindle, 100 rpm at room temperature.

|  | A | B | C | D | E | F |
|---|---|---|---|---|---|---|
| PVOH | 45.00 | 40.00 | 33.00 | 40.00 | 40.00 | 40.00 |
| Resin (45%) | 5.60 | 11.10 | 18.90 | 7.40 | 14.80 | — |
| Starch (40%) | 6.25 | 12.50 | 21.25 | 16.70 | 8.30 | 25.00 |
| Water | 443.05 | 436.40 | 426.85 | 435.90 | 436.90 | 435.00 |
| Viscosity | 480 cps | 330 cps | 190 cps | 320 cps | 385 cps | 305 cps |

To illustrate the effect of the molecular weight of the cationic polymer, similar products were formulated using a comparable amount of a cationic polyacrylamide described in Example I. This cationic acrylamide polymer is formulated at 18% solids and has a viscosity of approximately 1200 cps.

|  | G | H | I |
|---|---|---|---|
| PVOH | 45.00 | 40.00 | 33.00 |
| Resin (45%) | 5.60 | 11.10 | 18.90 |
| Polymer (18%) | 15.40 | 27.80 | 47.20 |
| Water | 434.00 | 421.00 | 400.90 |
| Viscosity | 515 cps | 470 cps | 240 cps |

Comparison of G to A, H to B and I to C show that low molecular weight starches give cationic PVOH solutions of lower viscosity than higher molecular weight polyacrylamides. All products remained fluid, without gellation or separation.

EXAMPLE VI

A dry one-package system was prepared as follows.
A portion of blocked glyoxal resin (Sequex(®)R from Sequa Chemical Corp.) was poured into a tray, forming a thin film over the bottom. This was allowed to air-dry for three days until it became a dry, brittle film. The film was broken and removed from the tray, and pulverized in a Waring blender. A fine amber powder was obtained. This powder was non-hygroscopic, did not form lumps and was free-flowing.

A portion of cationic acrylamide copolymer as described in Example I (Sunrez PC) was poured into a tray, forming a thin film, and allowed to air-dry for three days. It formed a clear, brittle film which was pulverized in a blender. A white, granular powder was obtained.

A pint jar was used as a mixing vessel into which 40 g. of dry PVOH (Elvanol(®)71–30 from DuPont), 13.3 g. of the above dried resin, and 6.7 g. of the above dried cationic acrylamide copolymer were placed. The components were in the proportions of 66.7% PVOH, 22.2% blocked glyoxal resin and 11.1% cationic copolymer. The jar was shaken and tumbled to thoroughly mix the contents, affording an off-white powder. This mixture was divided into two equal portions for aging studies.

One portion was placed into an oven for 30 days of aging at 50° C. The others remained at ambient temperature on the bench. At the end of the 30 day aging period both samples were examined. The oven-aged sample had darkened slightly from an off-white to a very light beige. The bench sample remained an off-white. Both samples were free-flowing powders with no lumps.

Twenty grams of each sample were placed into separate beakers and slurried in 180 g. of deionized water, affording 10% solutions. Each beaker was heated with agitation to 90° C. for 30 minutes, then cooled to ambient temperature. The bench-top sample produced a clear, pale amber solution having a Gardner color of 2, and Brookfield viscosity of 435 cps (#3, 100 rpm). The oven-aged sample produced a clear, pale amber solution having a Gardner color of 4 and a Brookfield viscosity of 635 cps (#3, 100 rpm).

These samples demonstrates the ability of this particular blocked glyoxal resin to be air-dried, and for this invention to be incorporated in pre-determined ratios into a one-package system. It further demonstrates the shelf life of the dry package.

A similar blocked glyoxal resin (Sunrez 700M, a cyclic urea, glyoxal, glycol condensate) was air-dried as described above. This product afforded a sticky syrup which was unsuitable for pulverizing or dry blending. Other blocked glyoxal resins, particularly those of the glyoxal/glycol or glyoxal/polyol condensation type were found to afford similar syrups upon drying which are unsuitable as is for a dry system. For this dry system the blocked glyoxal resin chosen needs to be dryable.

What is claimed is:

1. A cationic polyvinyl alcohol binder additive comprising:
   reaction product of an aqueous solution of a blocked glyoxal resin, a cationic water-soluble aldehyde reactive polymer and a polyvinyl alcohol polymer.

2. Additive of claim 1 comprising:
   10 to 60% of the blocked glyoxal resin and the cationic water-soluble aldehyde reactive polymer, and 40 to 90% of the polyvinyl alcohol polymer, by dry weight of the additive.

3. Additive of claim 2 wherein the dry weight ratio of blocked glyoxal resin to cationic polymer is within the ratio of 1:4 to 25:1.

4. Additive of claim 3 wherein the blocked glyoxal resin is the reaction product of a glyoxal with a blocking component selected from the group consisting of urea, substituted urea, cyclic urea, propylene urea, substituted propylene urea, glycol, polyol and mixtures thereof.

5. Additive of claim 4 wherein the blocking component is selected from the group consisting of urea o cyclic urea and the level of glyoxal: blocking component is within the range of about 0.8 to 2.2:1.

6. Additive of claim 4 wherein the cationic water-soluble aldehyde reactive polymer is a cationic acrylamide copolymer.

7. Additive of claim 6 wherein the cationic acrylamide copolymer is a copolymer of an acrylamide selected from the group consisting of acrylamide, methacrylamide, N,N-dimethyl acrylamide and N-methylol acrylamide with a cationic ethylenically unsaturated monomer.

8. Additive of claim 4 wherein the cationic water-soluble aldehyde reactive polymer is a cationic starch.

9. Additive of claim 4 wherein the cationic water-soluble aldehyde reactive polymer is a cationic guar gum.

10. Additive of claim 7 wherein the polyvinyl alcohol polymer is a completely hydrolyzed grade.

11. Additive of claim 4 comprising 25–40% of the blocked glyoxal resin and cationic water-soluble aldehyde reactive polymer, and 60–75% of the polyvinyl alcohol polymer, by dry weight of the additive.

12. Additive of claim 11 wherein the reaction product is a stable aqueous solution having a solids level of up to 12%.

13. Additive of claim 4 wherein the reaction has been carried out at 85° to 95° C. for 10 to 30 minutes.

14. Additive of claim 13 wherein the aqueous solution is fluid having a viscosity of less than 3000 cps when measured with a Brookfield viscometer with a #3 spindle at 20 rpm and at room temperature.

15. Additive of claim 14 having a pH of 4–7.5.

16. A dry free-flowing cationic polyvinyl alcohol additive for reaction in aqueous solution and use in the wet-end of a paper making process comprising:
 a dry mixture of a blocked glyoxal resin, a cationic water-soluble aldehyde reactive polymer and a polyvinyl alcohol polymer.

17. Additive of claim 16 comprising:
 10 to 60% of the blocked glyoxal resin and the cationic water-soluble aldehyde reactive polymer, and 40 to 90% of the polyvinyl alcohol polymer, by dry weight of the additive.

18. Additive of claim 17 wherein the dry weight ratio of blocked glyoxal resin to cationic polymer is within the ratio of 1:4 to 25:1.

19. Additive of claim 18 wherein the blocking component is selected from the group consisting of urea or cyclic urea and the level of glyoxal: blocking component is within the range of about 0.8 to 2:1.

20. Additive of claim 18 wherein the cationic water-soluble aldehyde reactive polymer is a cationic acrylamide copolymer.

21. Additive of claim 18 wherein the cationic water-soluble aldehyde reactive polymer is a cationic starch.

22. Additive of claim 18 wherein the cationic water-soluble aldehyde reactive polymer is a cationic guar gum.

23. Additive of claim 20 wherein the polyvinyl alcohol polymer is a completely hydrolyzed grade.

24. Additive of claim 19 comprising 25–40% of the blocked glyoxal resin and cationic water-soluble aldehyde reactive polymer, and 60–75% of the polyvinyl alcohol polymer, by dry weight of the additive.

* * * * *